United States Patent
Tsujino

(10) Patent No.: US 6,721,013 B1
(45) Date of Patent: Apr. 13, 2004

(54) AUTOMATIC FOCUSING APPARATUS

(75) Inventor: Kazuhiro Tsujino, Matsubara (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/078,717

(22) Filed: May 14, 1998

(30) Foreign Application Priority Data

May 15, 1997 (JP) .............................................. 9-125789

(51) Int. Cl.⁷ .............................................. H04N 5/232
(52) U.S. Cl. ...................................................... 348/345
(58) Field of Search ................................. 348/352, 208, 348/345, 347; 396/52–55

(56) References Cited

U.S. PATENT DOCUMENTS

| | | | |
|---|---|---|---|
| 4,774,538 A | * 9/1988 | Kawai | 396/53 |
| 4,833,541 A | * 5/1989 | Takuma et al. | 348/345 |
| 5,061,951 A | * 10/1991 | Higashihara et al. | 396/95 |
| 5,548,370 A | 8/1996 | Nakamura et al. | 354/402 |
| 5,649,239 A | 7/1997 | Tamekuni | 396/104 |
| 5,752,094 A | 5/1998 | Tsutsumi et al. | 396/76 |
| 5,761,545 A | * 6/1998 | Tanaka et al. | 348/208 |
| 5,940,630 A | * 8/1999 | Washisu | 348/208 |
| 6,091,448 A | * 7/2000 | Washisu et al. | 348/208 |

FOREIGN PATENT DOCUMENTS

| | | |
|---|---|---|
| JP | 360147710 A * | 8/1985 |
| JP | 7-77649 | 3/1995 |
| JP | 07077649 A | 3/1995 |
| JP | 08094918 | 4/1996 |

OTHER PUBLICATIONS

Copy of European Search Report for Corresponding European Patent Application No. 98108817.2–2217 dated Jun. 3, 2003.

* cited by examiner

Primary Examiner—Wendy R. Garber
Assistant Examiner—Rashawn N. Tillery
(74) Attorney, Agent, or Firm—Westerman, Hattori, Daniels & Adrian, LLP

(57) ABSTRACT

A rotational movement in the horizontal direction of a lens unit is detected by a horizontal angular velocity sensor, amplified by an amplifier and converted to a digital signal by an A/D converter for input to a focus controlling circuit. When a value obtained by multiplying a focal length detected by a zoom lens reference position sensor by a detected amount of change in angular velocity exceeds a predetermined threshold value, focus controlling circuit stops the focusing operation by a focus motor driver and a focus motor.

6 Claims, 4 Drawing Sheets

AUTOMATIC FOCUSING APPARATUS

BACKGROUND OF THE INVENTION

1. Field of the Invention

The present invention relates automatic focusing apparatuses and, more particularly, to an automatic focusing apparatus used for a video camera or the like having a zoom mechanism.

2. Description of the Background Art

When a video camera is used for panning photography, because of the change in a distance between the video camera and an object, focusing operation is performed many times, thereby resulting in unclear defocused images with fuzziness. To solve such problem, in Japanese Patent Laying-Open No. 7-77649, for example, a method for detecting an amount of panning by an angular velocity sensor to stop focusing operation has been proposed.

In this case, an output value from the angular velocity sensor is directly used for detecting the amount of panning. If the output from the angular velocity sensor does not return to a zero or reference potential in a prescribed period of time, the angular velocity sensor determines that a camera is in a process of panning and stops the focusing operation or reduces the speed of an AF (Auto Focus) motor.

In an automatic focusing method of the above described conventional example, infrared radiation is emanated so that the focusing operation is performed by the light reflected by an object. There is another example of the automatic focusing method, called a climbing method, in which focusing is performed by a high frequency component of a video signal. In this method, a picture is moved due to panning or lens-shake, so that a spatial frequency and the high frequency component are reduced. As a result, it may erroneously be determined that fuzziness is caused by the change in a distance between a video camera and the object even if there is no change. This is a problem to be solved.

Even with the same amount of panning or shake, if the focal lengths are different, due to the difference in zoom positions, the amounts of movements of the objects on an actual screen appear different in proportion to the focal lengths. Further, when the output from the angular velocity sensor is directly used as in the conventional example, in the case of an angular velocity sensor in which a relatively inexpensive gyro sensor is used, an output value significantly changes with a change in temperature, so that sufficient accuracy is not ensured and a significant cost is required for temperature compensation.

Further, in a more preferred embodiment of the present invention, the lens unit includes a zoom mechanism. A focal length corresponding to a zoom position is detected and the detected focal length is multiplied by the amount of change in angular velocity.

SUMMARY OF THE INVENTION

Therefore, a main object of the present invention is to provide an automatic focusing apparatus with enhanced reliability by preventing unstable focusing operation due to camera-shake or panning.

Briefly summarized, the present invention is an automatic focusing apparatus for focusing an image input to an imaging element by controlling a lens unit. In the automatic focusing apparatus, a level of a high frequency component of a video signal obtained from the imaging element is generated by a focus evaluation value generating circuit as a focus evaluation value. Further, a focusing operation is performed such that the focus evaluation value attains a maximum value by changing a relative position of a lens of the lens unit with respect to the imaging element by a focus controlling circuit. When a horizontal rotational movement of the lens unit is detected by a rotational movement detecting circuit and, a value obtained by multiplying the detected amount of change in angular velocity of the lens unit by the focal length exceeds a predetermined threshold value, the focusing operation is stopped by the focus controlling circuit for a prescribed period of time.

Therefore, according to the present invention, when the value obtained by multiplying the detected amount of change in the angular velocity of the lens unit by the focal length exceeds the predetermined threshold value, the focusing operation is stopped for the predetermined period of time, whereby the automatic focusing apparatus with enhanced reliability can be implemented by preventing unstable focusing operation due to camera-shake or panning.

According to a more preferred embodiment of the present invention, a focusing operation is stopped in accordance with a value obtained by multiplying a detected amount of change in angular velocity of a lens unit by a focal length and, the focusing operation is started when a focus evaluation value determined by a focus controlling circuit is kept smaller than a threshold value which is different from the focus evaluation value for a predetermined period of time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
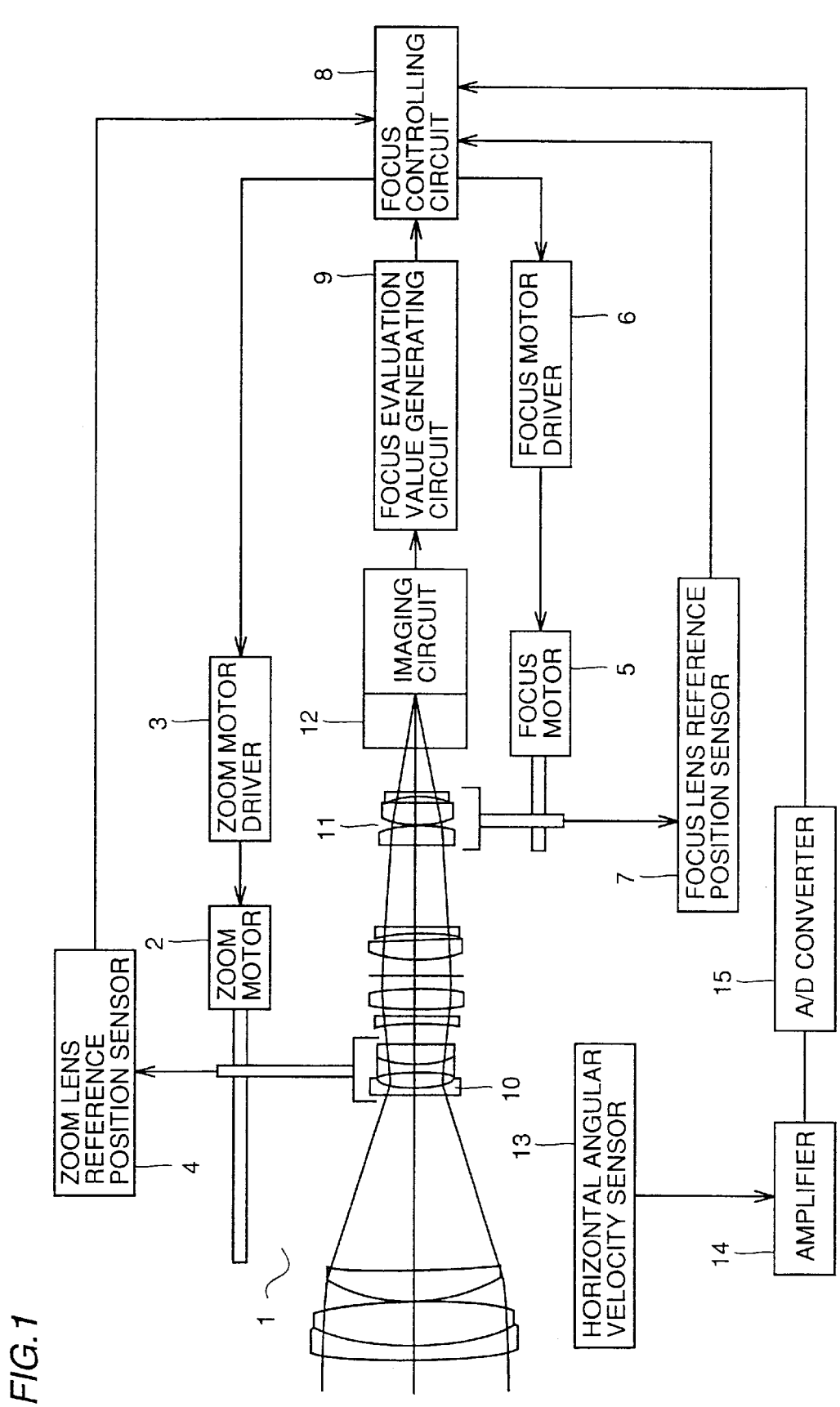
FIG. 1 is a block diagram showing an embodiment of the present invention.

Referring to FIG. 1, a lens unit 1 includes a zoom lens 10 having a variable power function for varying a focal length, and a focus lens 11 controlling focusing of an object image on an imaging element. Here, zoom lens 10 and focus lens 11 move back and forth in the direction of an optical axis by driving forces of a zoom motor 2 and a focus motor 5 through mechanisms (not shown), respectively.

Zoom motor 2 and focus motor 5 are driven by a zoom motor driver 3 and a focus motor driver 6, respectively. Reference positions of zoom and focus lenses 10 and 11 are detected by zoom and focus lens reference position sensors 4 and 7, respectively. The outputs obtained from the detection are both input to a focus controlling circuit 8.

The object image formed on the imaging element through the above mentioned lens unit 1 passes to a video signal by photoelectric conversion through an imaging circuit 12. A high frequency component of a luminance signal portion of the video signal is used to generate a focus evaluation value by a focus evaluation value generating circuit 9, which is input to focus controlling circuit 8 for focus controlling.

A horizontal angular velocity sensor 13 is mounted in the vicinity of lens unit 1 for detecting shake in the horizontal direction of lens unit 1. An output from horizontal angular velocity sensor 13 is amplified by an amplifier 14 and converted to a digital numerical value data by an A/D converter 15 for input to focus controlling circuit 8. Focus controlling circuit 8 is formed, for example of a microcomputer, and performs focus controlling based on the flow chart shown in FIGS. 2 and 3, which will be later described.

Figure 2:
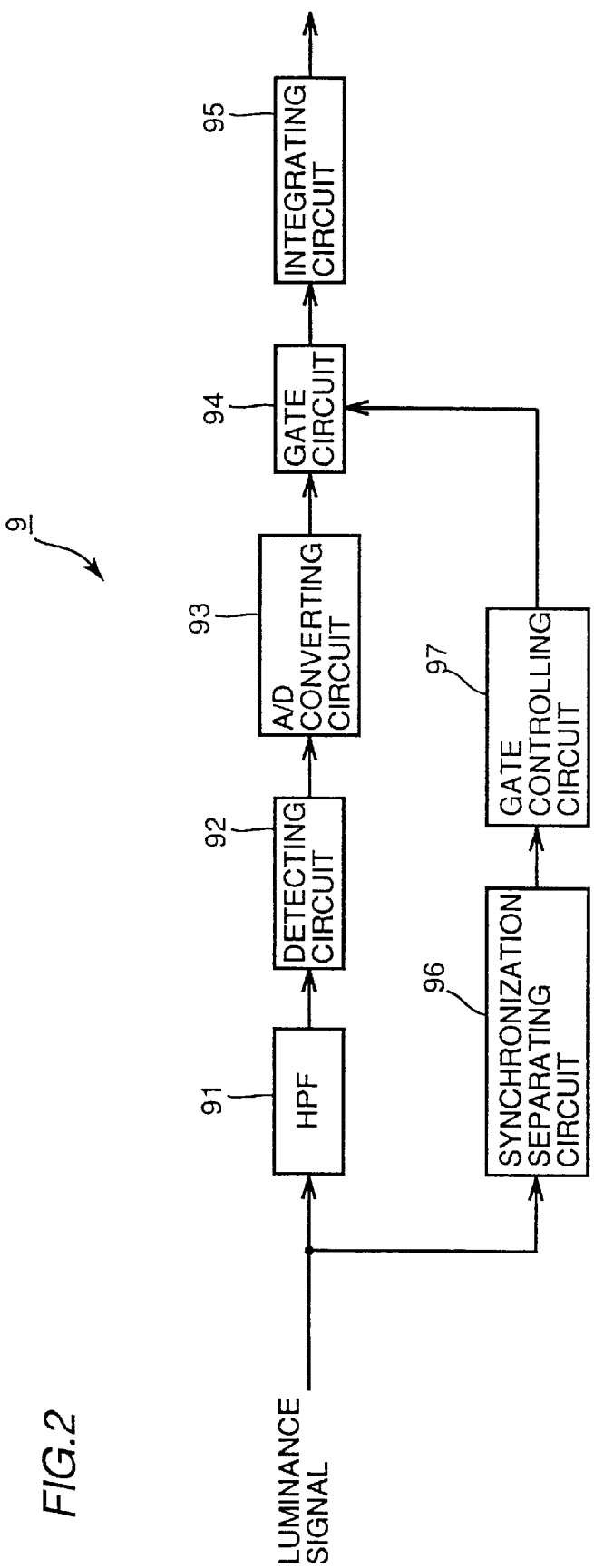
FIG. 2 is a block diagram specifically showing a focus evaluation value generating circuit in FIG. 1.
Figure 3:
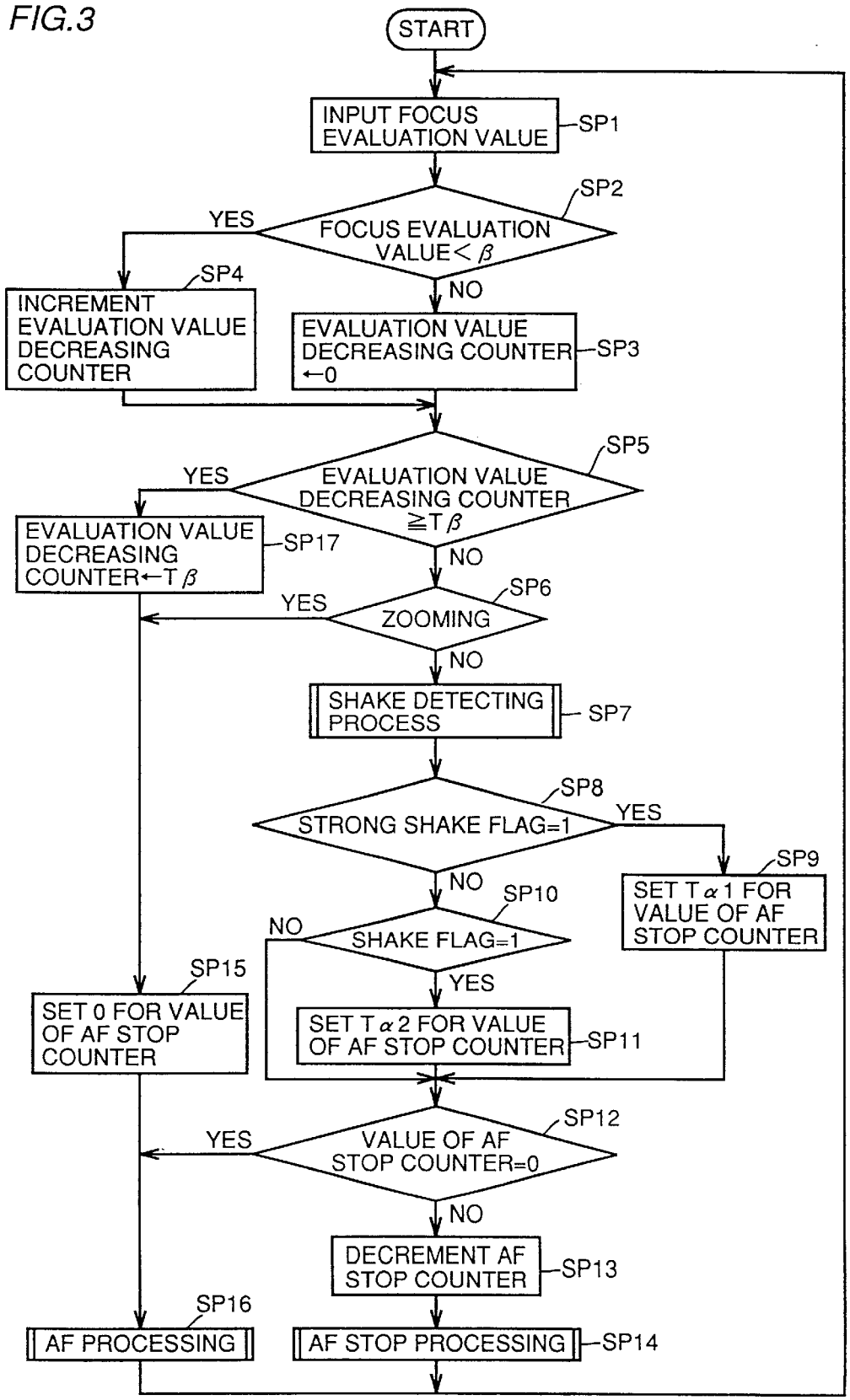
FIG. 3 is a flow chart in conjunction with a specific operation of focus controlling circuit shown in FIG. 1.

FIG. 2 is a block diagram specifically showing a focus evaluation value generating circuit 9 in FIG. 1. Referring to FIG. 2, a luminance signal is passed through a high pass filter (HPF) 91 and a high frequency component thereof is separated. Then, the amplitude is detected in a detecting circuit 92 in the next stage. The detected output is converted to a digital value in an A/D converter 93, and only a signal in a focus area which has been set in a central portion of the screen is extracted in a gate circuit 94 and integrated in an integrating circuit 95 for every field. Thus, a focus evaluation value of the current field is obtained.

At the time, a vertical and horizontal synchronizing signal, which has been separated from the luminance signal in a synchronization separating circuit 96, is input to a gate controlling circuit 97 for setting the focus area. Gate controlling circuit 97 sets the focus area in a rectangular shape in the central portion of the screen based on the vertical and horizontal synchronizing signal and a constant output from an oscillator, and supplies a gate keying signal for gate circuit 94 which allows passage of the luminance signal only in that area.

Focus evaluation value generating circuit 9 having the above described structure can always output a focus evaluation value corresponding to one field.

Referring now to FIGS. 1 to 4, a specific operation of the embodiment of the present invention will be described. In a step (abbreviated as an SP in the drawings) SP1 shown in FIG. 3, focus controlling circuit 8 receives a focus evaluation value from a focus evaluation value generating circuit 9 and compares the focus evaluation value with a predetermined threshold value β in a step SP2. Here, assume that threshold value β is smaller than the focus evaluation value obtained when focusing is achieved. Then, if the focus evaluation value is smaller than threshold value β, focus controlling circuit 8 determines that fuzziness exists. While threshold value β may be a fixed value, it may also be changed depending on iris opening or luminance variation of a screen.

When focus controlling circuit 8 determines that the focus evaluation value exceeds threshold value β, it resets an evaluation value decreasing counter formed of a software to 0 in a step SP3. On the other hand, when focus controlling circuit 8 determines that threshold value β exceeds the focus evaluation value, it increments the evaluation value decreasing counter in a step SP4. Then, in a step SP5, if the evaluation value decreasing counter is at or greater than a prescribed value $T_B$, focus controlling circuit 8 determines that fuzziness really exists as the focus evaluation value is continuously kept at a low value. As a result, focus controlling circuit 8 inputs $T_B$ to the evaluation value decreasing counter in a step SP17, resets an AF stop counter formed of the software to 0 in a step SP15 and performs a usual AF processing in a step SP16. The value of $T_B$ is set between several msec and several hundreds of msec.

If the focus evaluation value is not continuously kept at a low value, shake detecting is performed in a step SP7 if zooming is not being performed in a step SP6. The shake detecting subroutine will later be described. Because defocusing may often be caused during zooming especially from the wide direction to the tele direction, the AF stop is not performed during zooming in step SP6.

Thereafter, when a strong shake flag set by the shake detecting subroutine in step SP7 indicates 1, the value of the AF stop counter is set at $T\alpha_1$ in a step SP9. If the strong shake flag indicates 0 and only a shake flag indicates 1 in a step SP8, the value of the AF stop counter is set at $T\alpha_2$ in a step SP11. Here, assume that $T\alpha_1 \geq T\alpha_2$ and the values of $T\alpha_1$ and $T\alpha_2$ are between several msec and several hundreds of msec.

If the AF stop counter is not at 0 in a step SP12, it is decremented in a step SP13 and the AF stop processing is performed in a step SP14. If the AF stop counter is at 0 in step SP12, the usual AF processing is performed in a step SP16.

Figure 4:
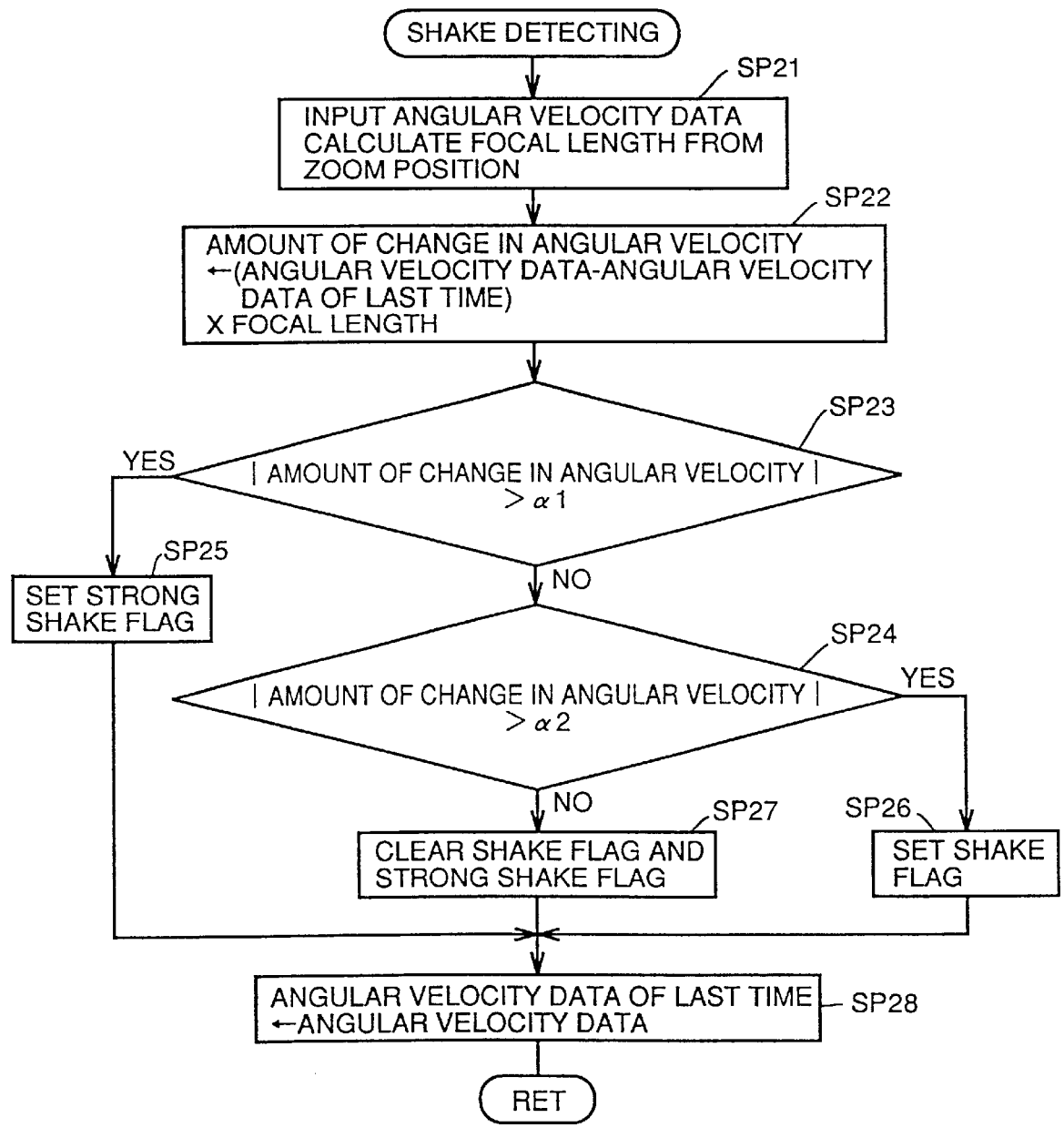
FIG. 4 is a flow chart of a subroutine in conjunction with an operation of shake detecting shown in FIG. 2.

Referring now to FIG. 4, the shake detecting subroutine will be described. An output from angular velocity sensor 13 is amplified by amplifier 14, angular velocity data A/D converted by A/D converter 15 is received in a step SP21 and a focal length is obtained from a zoom position. In a step SP22, angular velocity data, which has been used last time, is subtracted from the received angular velocity data and, the result is multiplied by the focal length to obtain an amount of change in angular velocity. It is determined in a step SP23 if an absolute value of the amount of change in angular velocity is greater than threshold value $\alpha_1$, and if the absolute value is greater than threshold value $\alpha_1$, the strong shake flag is set in a step SP25. If it is determined in a step SP24 that the absolute value is greater than $\alpha_1$, the shake flag is set in a step SP26.

If the absolute value is smaller than $\alpha_2$, both strong shake flag and shake flag are cleared in a step SP27. Assume that $\alpha_1 > \alpha_2$, where $\alpha_1$ and $\alpha_2$ are set in consideration with the balance with the variation in the focus evaluation value. Further, assume that $\alpha_2$ represents an absolute value of the amount of change in angular velocity, which value causes the variation in the evaluation value which may or may not influence the AF operation. Finally, in a step SP28, the angular velocity data received this time is stored as angular velocity data of last time for using it next time.

Here, supplementary description of the above described AF stop processing will be provided. While a method of stopping the driving of focus lens 11 by focus motor 5 shown in FIG. 1 is possible as a method of AF stopping, alternatively, the AF stopping may be performed by preventing refocusing or by preventing only a part of the AF processing. For example, when a series of AF operations includes controlling of the direction, climbing, acknowledging an apex and monitoring, the driving of focus lens 11 may be stopped only during the acknowledging of the apex and monitoring.

As described above, according to the present embodiment, unstable focusing operation due to camerashake, panning or the like is prevented. In other words, variations in the special frequency of the picture and in the focus evaluation value which is the high frequency component of the video signal only occur when the angular velocity changes. In addition, as an amount of movement of the object on the actual screen is proportional to the focal length, a value obtained by multiplying the amount of change in angular velocity by the focal length is defined as a shake variation value.

When the shake variation value exceeds a prescribed threshold value α, the auto focus operation is stopped for a given period T or a period Tα which changes with threshold value α. As the high frequency component of at least 100 kHz to several hundreds of kHz is generally used for the focus evaluation value and such high frequency component is related to a vertical line on the screen, shaking in a transverse direction which causes blurring of a vertical component of the image needs only be detected. Thus, angular velocity sensor 13 needs only function in the horizontal direction.

In addition, although stopping of the auto focus operation when camera-shake and panning are caused in a focused state is effective for stabilizing auto focusing, stopping the auto focus operation initially in a defocused state would result in an unclear image. Therefore, auto focusing had better not be stopped in the defocused state. In a focused state, even if the focus evaluation value may significantly be decreased temporarily due to camera-shake and panning, it is rarely decreased continuously. This is because panning exactly at the same speed is impossible. Therefore, when the focus evaluation value becomes lower than threshold value β for a given period Tβ, it is determined that the lens unit is in the defocused state and stopping of the auto focusing due to camera-shake and panning is not performed and, when the auto focusing is stopped, it is started.

As in the foregoing, according to the embodiment of the present invention, by stopping the focusing operation for a predetermined period of time when the value obtained by multiplying the amount of change in angular velocity of the lens unit detected by the angular velocity sensor by the focal length exceeds the predetermined threshold value, the unstable auto focus operation due to camera-shake and panning is prevented and the automatic focusing apparatus with enhanced reliability can be implemented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing apparatus focusing an image input to an imaging element by controlling a lens unit, comprising:
   focus evaluation value generator outputting a level of a high frequency component of a video signal obtained from said imaging element as a focus evaluation value;
   focus controller changing a relative position of a lens of said lens unit with respect to said imaging element to perform a focusing operation such that said focus evaluation value attains a maximum value;
   rotational movement detector detecting a rotational movement of said lens unit in a horizontal direction; and
   controller stopping said focusing operation by said focus controller for a predetermined period of time when a value obtained by multiplying an amount of change in angular velocity of said lens unit detected by said rotational movement detector by said focal length of said lens unit exceeds a predetermined threshold value.

2. The automatic focusing apparatus according to claim 1, wherein said controller changes a period of time during which said focusing operation is stopped in accordance with said detected value obtained by multiplying said amount of change in angular velocity of said lens unit by said focal length.

3. The automatic focusing apparatus according to claim 1, wherein said controller starts said focusing operation by said focus controller when said focus evaluation value from said focus controller is continuously kept lower than a threshold value different from said predetermined threshold value for said predetermined period of time.

4. The automatic focusing apparatus according to claim 1, further comprising
   focal length detector detecting a focal length corresponding to a zoom position of said lens unit, wherein
       said lens-unit includes a zoom mechanism and said controller multiplies the focal length detected by said focal length detector by said amount of change in angular velocity.

5. The automatic focusing apparatus according to claim 2, further comprising
   focal length detector for detecting a focal length corresponding to a zoom position of said lens unit, wherein
       said lens unit includes a zoom mechanism and said controller multiplies the focal length detected by said focal length detector by said amount of change in angular velocity.

6. The automatic focusing apparatus according to claim 3, further comprising
   focal length detector for detecting a focal length corresponding to a zoom position of said lens unit, wherein
       said lens unit includes a zoom mechanism and said controller multiplies the focal length detected by said focal length detector by said amount of change in angular velocity.

* * * * *